United States Patent
Kennedy

(10) Patent No.: US 10,677,367 B2
(45) Date of Patent: Jun. 9, 2020

(54) FIRE HYDRANT

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 60 days.

(21) Appl. No.: 15/934,330

(22) Filed: Mar. 23, 2018

(65) Prior Publication Data

US 2019/0293198 A1  Sep. 26, 2019

(51) Int. Cl.
*F16K 27/00* (2006.01)
*F16K 1/50* (2006.01)
*E03B 9/02* (2006.01)
*A62C 31/02* (2006.01)

(52) U.S. Cl.
CPC .............. *F16K 27/006* (2013.01); *F16K 1/50* (2013.01); *A62C 31/02* (2013.01); *E03B 9/02* (2013.01); *Y10T 137/5327* (2015.04); *Y10T 137/5468* (2015.04)

(58) Field of Classification Search
CPC .... F16K 27/006; F16K 1/50; Y10T 137/5468; Y10T 137/5327; A62C 31/02; E03B 9/02; E03B 9/04; E03B 9/06
See application file for complete search history.

(56) References Cited

U.S. PATENT DOCUMENTS

| | | | | |
|---|---|---|---|---|
| 3,450,148 A | * | 6/1969 | Mongelluzzo | F16K 35/10 137/296 |
| 4,284,099 A | * | 8/1981 | Rifat | E03B 9/04 137/296 |
| 5,630,442 A | * | 5/1997 | Julicher | E03B 9/06 137/296 |
| 5,722,450 A | * | 3/1998 | Julicher | E03B 9/06 137/296 |
| 5,727,590 A | * | 3/1998 | Julicher | E03B 9/06 137/296 |
| 6,112,761 A | * | 9/2000 | Scotto | E03B 9/06 137/296 |
| 6,901,950 B1 | * | 6/2005 | Burt | E03B 9/02 137/294 |
| 7,559,338 B2 | * | 7/2009 | Scobie | E03B 9/06 137/527 |
| 2014/0261731 A1 | * | 9/2014 | Bost | E03B 9/02 137/15.01 |

* cited by examiner

Primary Examiner — Mary E McManmon
Assistant Examiner — Kevin R Barss
(74) Attorney, Agent, or Firm — Brown & Michaels, PC

(57) ABSTRACT

A fire hydrant barrel includes a body having at least one wall and an anti-rotation pin opening through the at least one wall. The at least one wall defines an internal cavity. The fire hydrant barrel also includes a stem extending through the cavity of the body. The stem has an anti-rotation element, and the anti-rotation pin opening and the anti-rotation element are configured to receive an anti-rotation pin to lock the stem from rotating with respect to the body.

19 Claims, 3 Drawing Sheets

FIRE HYDRANT

BACKGROUND OF THE INVENTION

Field of the Invention

The invention pertains to the field of fire hydrants. More particularly, the invention pertains to an upper barrel of a fire hydrant having an anti-rotation pin.

Description of Related Art

In most locales, fire hydrants require annual inspections and maintenance. Even when not required, fire hydrants sometimes require maintenance. Maintenance and inspections often require some disassembly of a fire hydrant, such as disconnection of an upper barrel from a lower barrel of a dry fire hydrant, a bonnet from the upper barrel, or a head from a spool of a wet fire hydrant, followed by maneuvering of the heavy components.

Fire hydrants can be very heavy for a normal human to manipulate. Depending on the designated capacity of the fire hydrant, most fire hydrants can weigh roughly between 350 and 800 pounds. One person cannot normally manipulate a fire hydrant well, if at all, and multiple people and/or the aid of machinery is usually necessary. Further, the Occupational Safety and Health Administration (OSHA) can impose fines on employers who require dangerous lifts. After World War II, the Bureau of Labor Standards of the U.S. Department of Labor published "Bulletin No. 11—A Guide to the Prevention of Weight Lifting Injuries", which recommended a maximum lifting weight of 50 lbs. for men. Today, the National Institute for Occupational Safety and Health (NIOSH) publishes safe lifting guidelines with an algorithm to define a safe lift, and many workplaces simply restrict unassisted lifts to 50 pounds (22.68 kg). Many fire hydrants are designed with more parts than necessary, to decrease the weight per part, for example, to be under this 50 pound limit. These extra parts and joints render maintenance more complex, more expensive, and more time-consuming.

SUMMARY OF THE INVENTION

A fire hydrant barrel includes a body, an anti-rotation pin opening, and a stem. The body has at least one wall defining an internal cavity, and the anti-rotation pin opening extends through the at least one wall. The stem extends through the cavity of the body, and the stem has a first anti-rotation element. The anti-rotation pin opening and the first anti-rotation element are configured to receive an anti-rotation pin to lock the stem from rotating with respect to the body.

In another embodiment, a fire hydrant includes an upper barrel, and the upper barrel includes a body, an anti-rotation pin opening, and a stem. The body has at least one wall defining an internal cavity, and the anti-rotation pin opening extends through the at least one wall. The stem extends through the cavity of the body, and the stem has a first anti-rotation element. The anti-rotation pin opening and the first anti-rotation element are configured to receive an anti-rotation pin to lock the stem from rotating with respect to the body.

DETAILED DESCRIPTION OF THE INVENTION

Figure 1:
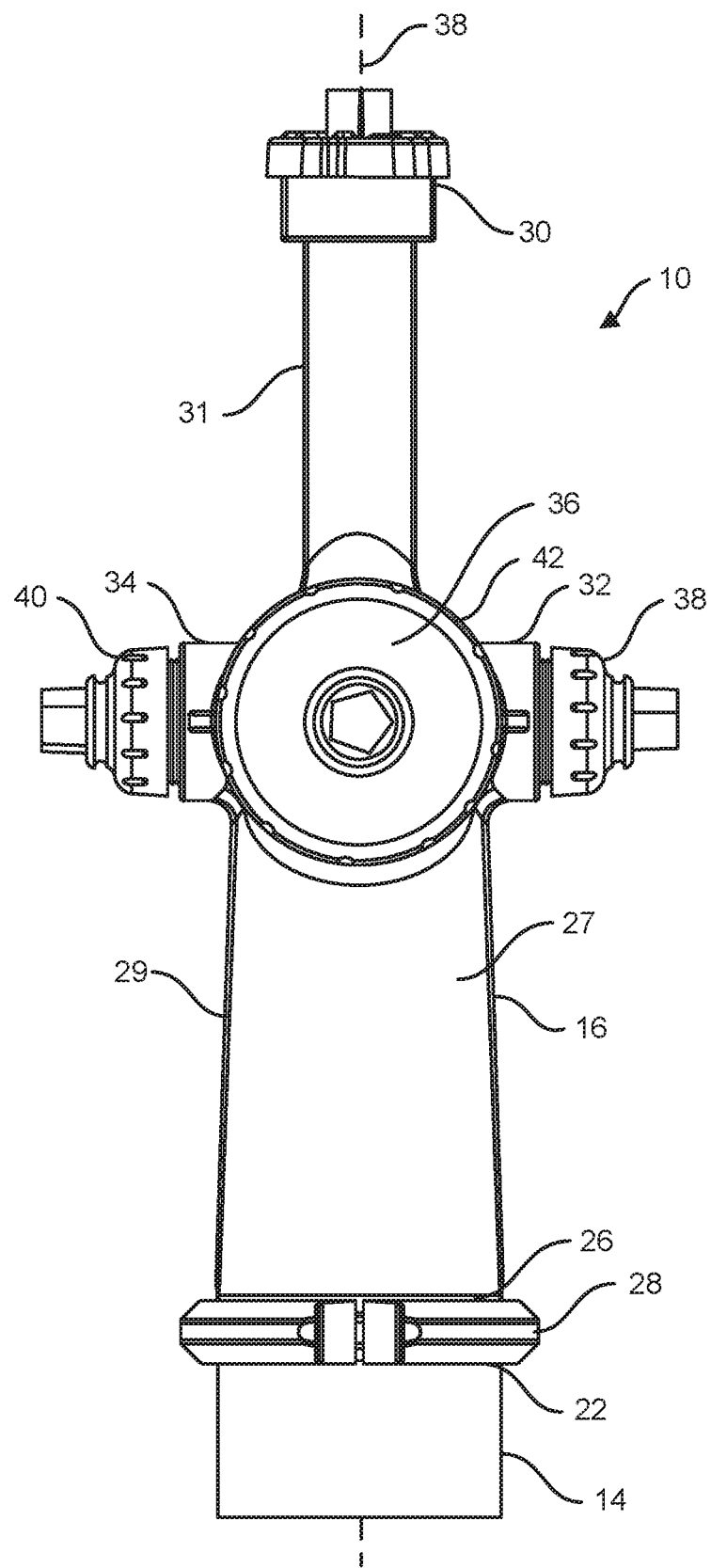
FIG. 1 shows a front view of a fire hydrant, according to an embodiment of the invention.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged with", "connected to", or "coupled to" another element or layer, it may be directly on, engaged with, connected to, or coupled to the other element or layer, or intervening elements or layers may be present. In contrast, when an element is referred to as being "directly on," "directly engaged with", "directly connected to", or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Certain aspects of fire hydrants are regulated by standards in order to assure consistent access and use by fire safety professionals. For example, fire hydrant color can be regulated to assure that fire safety professionals can quickly determine the pressure and flow capacity of any particular fire hydrant. For another example, outlets and outlet caps of a fire hydrant are regulated so fire hydrants can be accessed for use with known equipment and so fire hoses can connect consistently with all fire hydrants in a municipality. These standards limit the ability to modify fire hydrant design to reduce fire hydrant weight.

Figure 2:
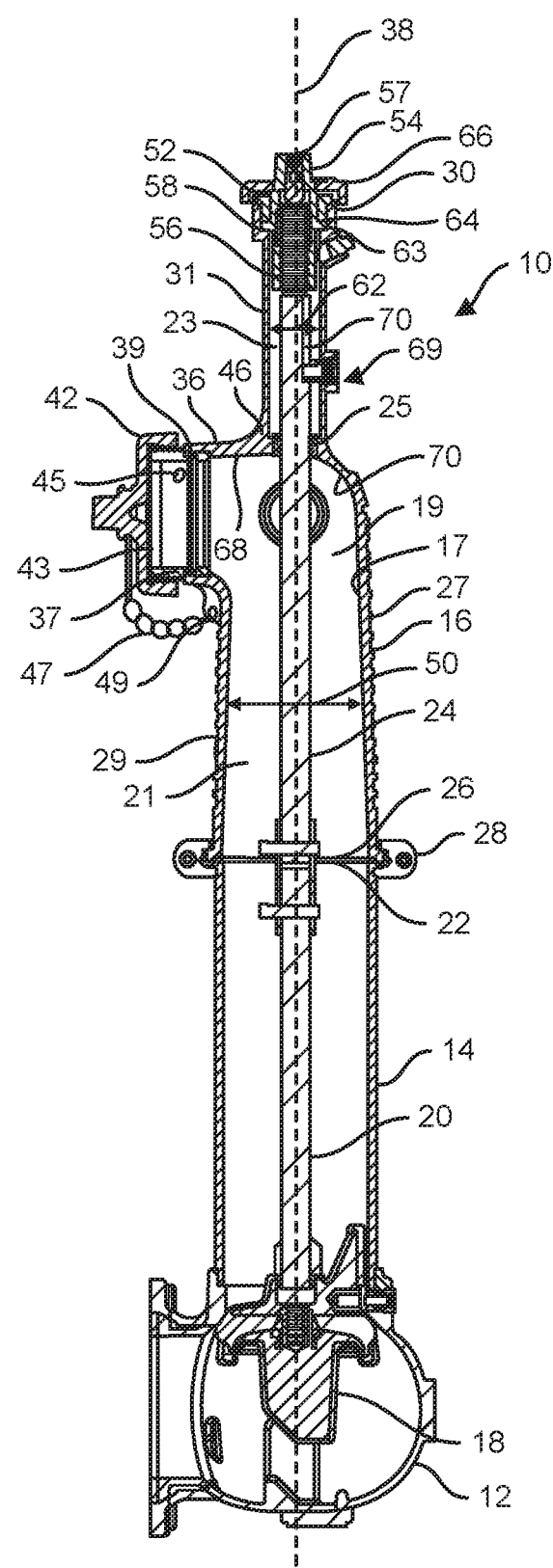
FIG. 2 shows a cross-sectional view of the fire hydrant illustrated in FIG. 1.

FIGS. 1 and 2 illustrate a fire hydrant 10 improved in shape and weight, to facilitate easier, safer, and less expensive manual handling, while maintaining important design standards. Despite being built to meet certain regulated standards, fire hydrants exist in large variety, such as wet barrels and dry barrels, ranges in capacity, ranges in size, and other variations. While the fire hydrant 10 is illustrated as a dry barrel fire hydrant, it should be noted that the features to lessen the weight of the fire hydrant 10 can be adapted to wet barrel fire hydrants and/or various other fire hydrants to make these fire hydrants lighter in weight and easier to manipulate as well.

The fire hydrant 10 includes a base 12, a lower barrel 14, and an upper barrel 16. These three components can be among the heaviest components of a fire hydrant. The base 12 and the lower barrel 14, which can be manufactured as an integrated, single piece or coupled by some form of fastener (s), can be installed below ground. The base 12 can couple with water supply piping (not shown), such as piping in a municipal water-supply system. As an elbow, the base 12 can redirect water from a horizontally laid water-supply pipe into the vertically oriented lower barrel 14. The upper barrel 16 can be installed to a water supply system above ground, mounted to the lower barrel 12.

The fire hydrant 10, being a dry barrel fire hydrant, has a main valve 18 located in the base, which seals water out of the fire hydrant underground (e.g., below the frost line) when not in use, to prevent water from freezing inside the fire hydrant in climates that experience freezing temperatures above ground. The main valve 18 is coupled to a lower stem 20, which can be actuated by an operator (e.g., a fireperson or maintenance person) to open and close the main valve 18, as described further herein below.

The lower barrel 14 is generally cylindrically shaped, and the lower barrel houses the lower stem 20, which extends lengthwise through the center of the lower barrel 14. At an end 22 of the lower barrel 14, where the lower barrel 14 couples with the upper barrel 16, the lower stem 20 also couples with an upper stem 24.

The upper barrel 16 can be coupled with the lower barrel 14 at a first end 26 of the upper barrel 16. This coupling can be fastened with a breaking clamp 28, which facilitates disengagement of the upper barrel 16 and upper stem 24 from the lower barrel 14 and the lower stem 20 in the case of impact, such as might be caused by a vehicle. The coupling of the upper barrel 16 to the lower barrel 14 can be accomplished with just two bolts, thereby easing the time and complexity to remove the upper barrel 16 from the lower barrel 14. From the first end 26 of the upper barrel 16, the upper stem 24 extends lengthwise through the center of the upper barrel 16 to a second end 30 of the upper barrel 16.

The upper barrel 16 can have a body 27 with at least one side wall 17 and a top wall 68 that defines an internal cavity 19 through which water (or another fluid) can flow. The body 27 includes a lower portion 29, which is generally cylindrical in shape, or slightly conical with a tapering diameter. The tapering diameter requires less material than the cylindrically shaped lower portion, and has less weight. The overall weight of the upper barrel 16 can be less than 50 pounds. The lower portion 29 defines a main cavity 21.

Between the first end 26 and the second end 30 of the upper barrel 16, delineating the lower portion 29 from an upper portion 31 of the body 27, and fluidly connected directly to the main cavity 21, is at least one outlet extending from the body 27, to allow water to flow out of the fire hydrant 10. A fire hose (not shown) can be connected to the fire hydrant 10 at the at least one outlet using a fire hose connector (not shown). Any now-known or future-developed fire hose connector can be used, and the outlet can be adapted for use with any now-known or future-developed fire hose and fire hose connector. While any now-known or future-developed number and/or sized outlet can be implemented, fire hydrant 10 is illustrated with a first outlet 32, a second outlet 34, and a third outlet 36. All three outlets 32, 34, 36 extend approximately perpendicular to a lengthwise, center axis 38 of the upper barrel 16, such that water flowing vertically upward through the upper barrel 16 would be redirected approximately 90 degrees to a horizontal direction away from the lengthwise, center axis 38 in order to exit the upper barrel 16. The redirection of water is facilitated by a rounded transition between the side wall 17 and the top wall 68 of the main cavity 21. As opposed to prior fire hydrants, in which the outlets form a T junction with the upper barrel 16, and in which the main cavity extends beyond (above, in an installed, upright orientation) the outlet, the outlets 32, 34, 36 of fire hydrant 10 form an L junction with the upper barrel 16, and the main cavity 21 of the fire hydrant 10 ends at the upper boundary of the outlets 32, 34, 36. In other words, the main cavity merges or transitions into the nozzle, to create a continuous flow path that turns 90 degrees into the outlets 32, 34, 36. This flow path reduces turbulence as compared to prior fire hydrants.

The first and second outlets 32, 34 are of an equal size, (i.e., equal diameter) which is smaller than the third outlet 36. The first and second outlets 32, 34 are positioned oppositely around the circumference of the fire hydrant 10, such that the first and second outlets 32, 34 would let out water in opposite directions (i.e., away from each other and from the center axis of the fire hydrant 10). The third outlet 36 is positioned between the first and second outlets 32, 34, equidistant from the first and second outlets 32, 34. All three outlets 32, 34, 36 can have a center axis in a plane perpendicular to the center axis 38 of the upper barrel 16. The first, second, and third outlets 32, 34, 36 are sealed with a first cap 38, a second cap 40, and a third cap 42, respectively.

The outlet 36 can include a nozzle 37, an o-ring 39, the cap 42, a nozzle cap gasket 43, and a nozzle retaining screw 45. The nozzle 37 also can include a nozzle cap chain 47 and a nozzle chain hook 49, for example an S-hook, which connects one end of the nozzle cap chain 47 to the body 27 of the fire hydrant 10. Each other nozzle 32, 34 can have similar components appropriately sized.

Extending from the first outlet 32, the second outlet 34, and the third outlet 36 to the second end 30 of the upper barrel 16, is the upper portion 31 of the upper barrel 16. The upper portion 31 defines a secondary cavity 23, which is part of the internal cavity 19, but delineated from the main cavity 21 by the top wall 68 of the main cavity. An opening between the secondary cavity 23 and the main cavity 21 allows the upper stem 24 to pass through, but a seal 25 can be positioned between the main cavity 21 and the secondary cavity 23, at the joint between the lower portion 29 and the upper portion 31, to seal between the top wall 68 and the upper stem 24.

The upper portion 31 has a generally cylindrical shape and a reduced diameter relative to the lower portion 29 and relative to conventional fire hydrants. Looking at outlet 36 for example, the upper portion 31 extends to the second end 30, more specifically, from an intersection 46 of the body 27 and the third outlet 36 closest to the second end 30. For structural support of the intersection point 46, or for cosmetics, or otherwise, the intersection between the upper portion 31 of the body 27 and the third outlet 36 can be rounded. Similarly, the body 27 can be reduced in radius at similar points where the first outlet 32 and the second outlet 34 extend from the body, and the reduction can be tapered to create a rounded joint, again for added structural integrity, cosmetic purposes, or otherwise. It should be noted that while the upper portion 31 has a reduced diameter relative to the lower portion 29, if the hydrant were not cylindrical, but another shape that is not appropriately described as having a diameter, then the similar dimension for the shape would still be reduced. For example, if the fire hydrant 10 had an octagonal or a square cross section rather than a circular cross section, then a straight line drawn across the extent between opposing sides of the octagon or square would be reduced in the upper portion relative to the lower portion. In other words, the lower portion 29 of the body 27 can have a first dimension 60 spanning the main cavity 21 perpendicular to the axis 38 between opposing points on the at least one side wall 17, the upper portion 31 can have a second dimension 62 spanning the secondary cavity 23 perpendicular to the axis 38 between opposing points on the at least one side wall 17, and a value of the first dimension 60 can be greater than a value of the second dimension 62. In some embodiments, a value of the second dimension 62 can be less than 75% of a value of the first dimension 60. In some embodiments, a value of the second dimension 62 can be less than 50% of a value of the first dimension 60. In some embodiments, a value of the second dimension 62 can be less than 25% of a value of the first dimension 60.

The upper portion 31, being reduced in diameter, has significantly less material than equivalent portions of prior art fire hydrants. Because fire hydrants are made of heavy metal, the significant material reduction equates to significant weight reduction of the upper barrel 16. Further, in part because of the weight reduction facilitated by the lighter upper portion 31, the upper barrel has less need to split weight among multiple parts that can be connected to form the upper barrel. For example, no bonnet is necessary, which makes access of the stem and disassembly for maintenance quicker and easier.

At the second end 30 of the upper barrel 16, the fire hydrant 10 includes an operating stem nut 54 to actuate the upper and lower stem 24, 20 and thereby open and close the main valve 18. An end 56 of the upper stem 24 is threaded, and the operating stem nut 54 is correspondingly threaded, such that the operating stem nut 54 can be screwingly engaged with the end 56 of the upper stem 24 and inserted, at least partially, into the second end 30 of the upper barrel 16. A grease fitting 57 can be recessed into the operating stem nut 54 in order to provide for access to lubricate the threads on the end 56 and on the operating stem nut 54. The second end 30 of the upper barrel 16 steps to a larger diameter than other portions of the upper portion 31 of the body 27 of the upper barrel 16, creating a step or a stop surface 58 against which a flange 63 on the operating stem nut 54 can abut to limit movement of the operating stem nut 54 into the upper portion 31. The second end 30 with a larger diameter than other portions of the upper portion 31 can be a minority of the upper portion 31. The lesser the length is of the second end 30, the lesser is the material and weight of the fire hydrant 10.

A lock nut 52 can be secured over the flange 63 to limit movement of the operating stem nut 54 out of the upper portion 31. For example, the second end 30 can be internally threaded, and the lock nut 52 can be externally threaded such that the lock nut 52 can be threaded into the second end 30, to lock the flange 63 between the stop surface 58 and the lock nut 52. The operating stem nut 54, as a result, can be rotated without movement along the center axis 38 of the fire hydrant 10, and can, via threaded engagement with the upper stem 24, move the upper stem 24 along the center axis 38 to open or close the main valve 18. A thrust washer 64 can be positioned between the flange 63 and the lock nut 52 to act as an antifriction bearing to reduce operating torque of the operating stem nut 54. A cap 66 can cover the lock nut 52, to deflect moisture and dust.

Figure 3:
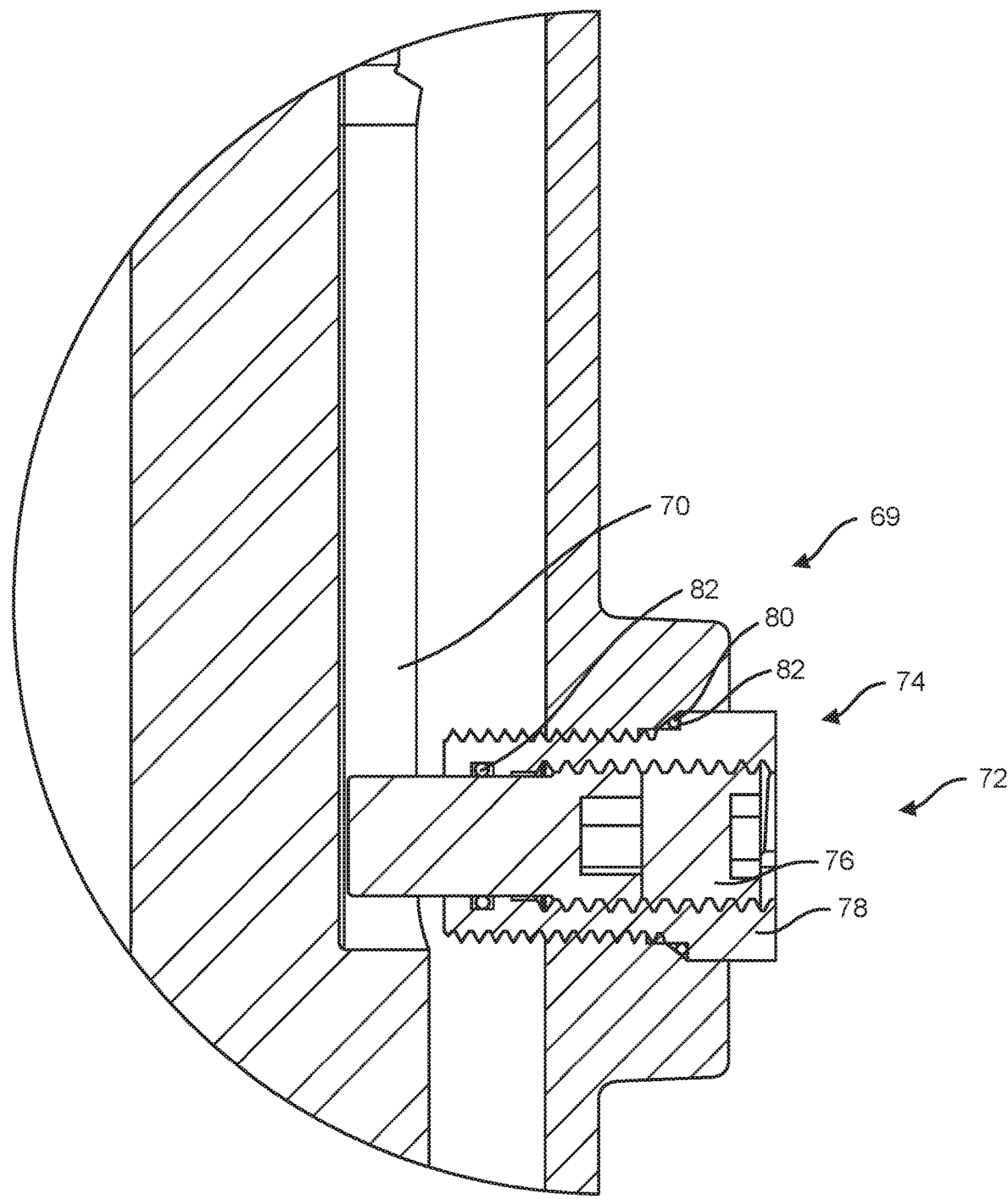
FIG. 3 shows a cross-section, detailed view of an anti-rotation system of the fire hydrant illustrated in FIG. 1.

FIG. 3 shows a cross-sectional, detailed view of an anti-rotation system 69, which can reduce or prevent rotation of the upper stem 24. For example, during rotation of the operating stem nut 54, friction between threads of the operating stem nut 54 and threads of the upper stem 24 can force the upper stem 24 in a rotational direction as well. Rotation of the upper stem 24 would result in rotation of the lower stem 20, which would reduce the efficiency of the lower stem 20 to move axially or lengthwise and to open or close the main valve 18, and which could rotate the main valve 18. The anti-rotation system can include an anti-rotation stem element 70, an anti-rotation pin opening 72, and an anti-rotation pin assembly 74. The anti-rotation stem element 70 can be, but is not limited to, a groove, slot, or recess extending lengthwise in the upper stem 24. During engagement with the anti-rotation pin assembly 74, the lengthwise extension of the anti-rotation stem element 70 facilitates lengthwise or axial movement of the upper stem 24 relative to the anti-rotation pin assembly 74. The anti-rotation stem element 70 could also be in the lower stem 20, but the upper portion 31 of the body 27, being narrower (or of smaller radius) than the lower portion 29 of the body 27, offers the benefit of a shorter anti-rotation pin assembly 72. Positioning the anti-rotation stem element 70 in the upper stem 24 also results in a shorter length of the upper stem 24, from the anti-rotation stem element 70 to the operating stem nut 54, being exposed to torsional force during actuation of the operating stem nut 54.

The anti-rotation pin opening 72 can be aligned with the anti-rotation stem element 70, extending through the side wall 17 at the upper portion 31 of the body 27. Again, the anti-rotation pin opening 72 could also be through the side wall 17 at the lower portion 29. The anti-rotation pin opening 72 is configured and sized to receive and/or engage the anti-rotation pin assembly 74. For example, the anti-rotation pin assembly 74 can have a diameter smaller than the diameter of the anti-rotation pin opening 72, each being matingly threaded, to threadably move the anti-rotation pin assembly 74 within the anti-rotation pin opening 72.

The anti-rotation pin assembly 74 can include an anti-rotation pin 76 and an anti-rotation bushing 78, as illustrated in FIG. 3. As seen in FIG. 3, the anti-rotation bushing 78 engages directly with the anti-rotation pin opening 72 of the upper barrel 16. The anti-rotation bushing 78 has external threads that engage with internal threads of the anti-rotation pin opening 72, and an outer O-ring 80 to create a fluid seal between the anti-rotation bushing 78 and the anti-rotation pin opening 72. The O-ring 80 can seat between a step 82 in both the anti-rotation pin opening 72 and the anti-rotation bushing 78 from a smaller diameter to a larger diameter.

The anti-rotation pin 76 can be inserted through the anti-rotation bushing 78. The anti-rotation pin 76 can have external threads that mate with internal threads of the anti-rotation bushing 78. An inner O-ring 82 can be positioned between the anti-rotation pin 76 and the anti-rotation bushing 78 to create a fluid seal between anti-rotation pin 76 and the anti-rotation bushing 78. The inner O-ring 82 can be positioned in an O-ring recess 84 in the anti-rotation bushing 78.

Both the pin 76 and the bushing 78 can be a durable, hard, corrosion-resistant, precision-tolerance-machinable metal, such as bronze, whereas the upper barrel 16 can be cast iron with dimensions of relatively low precision. The bushing 78 provides a fluid-sealed engagement with the anti-rotation pin opening 72 of the upper barrel 16 and does not require precision adjustability once installed. Once installed, the bushing 78 need not be adjusted at all unless, for example, maintenance requires the bushing 78 to be removed or replaced. The engagement between the bushing 78 and the pin 76, however, allows for precision and repeat adjustability, to allow the anti-rotation pin 76 to be repeatedly tightened or loosened, or adjusted to a desired depth.

The anti-rotation bushing 78 can be screwed or inserted into the anti-rotation pin opening 72 until the steps 82 abut, or compress the outer O-ring 80 and create a desired level of tightness. The anti-rotation pin 76 can be screwed or inserted into the anti-rotation bushing 78 to move the anti-rotation pin 76 in and out of engagement with the anti-rotation stem element 70. During engagement with the anti-rotation stem element 70 (for example, the anti-rotation pin 76 is in recess, slot, groove, etc.), the upper stem 24 is limited or prevented from rotating with respect to the upper portion 31 of the body 27, but can be allowed to move axially or lengthwise with respect to the upper stem 24 or the upper portion 31 of the body 27. When the operating stem nut 54 is turned, for example, to raise or lower the upper stem 24, lower stem 20, and main valve 18 by the threaded engagement between the operating stem nut 54 and the upper stem 24, the engagement or insertion of the anti-rotation pin 76 in the anti-rotation stem element 70 overcomes any tendency of the upper stem 24 to rotate with the operating stem nut 54.

While the engagement between the anti-rotation bushing 78 and the anti-rotation pin opening 72 is illustrated and described with threads, and the engagement between the anti-rotation pin 76 and the anti-rotation bushing 78 is illustrated and described with threads, any now-known or later-developed structure can be used by which the anti-rotation bushing 78 and the anti-rotation pin 76 can be inserted and positioned. Further, it is conceivable that the anti-rotation pin assembly 74 omit the anti-rotation bushing 78, and that the anti-rotation pin 76 engage directly with the anti-rotation pin opening 72.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A fire hydrant comprising:
   an upper barrel including:
     a body having a length, an axis extending the length of the body, at least one wall defining an internal cavity, and an anti-rotation pin opening through the at least one wall; and
     a stem extending parallel to the axis through the cavity of the body, the stem having an anti-rotation element and a length,
     the anti-rotation pin opening and the anti-rotation element configured to receive an anti-rotation pin to lock the stem from rotating with respect to the body,
     the anti-rotation element including a groove, the groove having sidewalls extending along the length of the stem.

2. The fire hydrant of claim 1, further comprising the anti-rotation pin positioned in the anti-rotation pin opening, the anti-rotation pin configured to engage or disengage the anti-rotation element and to couple with the anti-rotation pin opening to lock or release the stem from rotational movement relative to the body.

3. The fire hydrant of claim 2, wherein the anti-rotation pin opening is threaded and the anti-rotation pin is threaded to threadingly mate with the anti-rotation pin opening.

4. The fire hydrant of claim 2, further comprising an anti-rotation bushing, the anti-rotation bushing positioned in the anti-rotation pin opening, the anti-rotation pin positioned in the anti-rotation bushing.

5. The fire hydrant of claim 4, wherein the anti-rotation bushing has a step from a smaller diameter to a larger diameter, and the step of the anti-rotation bushing is configured to abut a step of the anti-rotation pin opening as a result of full insertion into the anti-rotation bushing, the anti-rotation pin being movable within and relative to the anti-rotation bushing into and out of engagement with the anti-rotation element of the stem.

6. The fire hydrant of claim 1, wherein the anti-rotation element includes a recess in the stem.

7. The fire hydrant of claim 1, wherein the anti-rotation element is aligned with the anti-rotation pin opening.

8. The fire hydrant of claim 1, further comprising at least one fluid outlet, wherein the body comprises a first portion and a second portion, the first portion forming a first length, the second portion forming a second length, the first portion coupled to the second portion, the first portion having a first dimension spanning the cavity perpendicular to the axis between opposing points on the at least one wall, the second portion having a second dimension spanning the cavity perpendicular to the axis between opposing points on the at least one wall, the first dimension being greater than the second dimension, the anti-rotation element being in the stem within the second portion.

9. The fire hydrant of claim 1, further comprising at least one fluid outlet, wherein the body comprises a first portion and a second portion, the first portion forming a first length, the second portion forming a second length, the first portion coupled to the second portion, the first portion having a first dimension spanning the cavity perpendicular to the axis between opposing points on the at least one wall, the second portion having a second dimension spanning the cavity perpendicular to the axis between opposing points on the at least one wall, the first dimension being greater than the second dimension, the anti-rotation pin opening extending through the at least one wall of the second portion.

10. A fire hydrant barrel comprising:
    a body having at least one wall defining an internal cavity, and an anti-rotation pin opening through the at least one wall; and
    a stem extending through the cavity of the body, the stem having an anti-rotation element and a length,
    the anti-rotation pin opening and the anti-rotation element configured to receive an anti-rotation pin to lock the stem from rotating with respect to the body, the anti-rotation element including a groove, the groove having sidewalls extending along the length of the stem.

11. The fire hydrant of claim 10, further comprising the anti-rotation pin positioned in the anti-rotation pin opening, the anti-rotation pin configured to engage or disengage the anti-rotation element and to engage the anti-rotation pin opening to lock or release the stem from rotational movement relative to the body.

12. The fire hydrant of claim 11, wherein the anti-rotation pin opening is threaded and the anti-rotation pin is threaded to threadingly mate with the anti-rotation pin opening.

13. The fire hydrant of claim 11, further comprising an anti-rotation bushing, the anti-rotation bushing positioned in the anti-rotation pin opening, the anti-rotation pin positioned in the anti-rotation bushing.

14. The fire hydrant of claim 13, wherein the anti-rotation bushing has a step from a smaller diameter to a larger diameter, and the step of the anti-rotation bushing is configured to abut a step of the anti-rotation pin opening as a result of full insertion into the anti-rotation bushing, the anti-rotation pin being movable within and relative to the anti-rotation bushing into and out of engagement with the anti-rotation element of the stem.

15. The fire hydrant of claim 10, wherein the anti-rotation element includes a recess in the stem.

16. The fire hydrant of claim 10, wherein the anti-rotation element is aligned with the anti-rotation pin opening.

17. The fire hydrant of claim 10, further comprising at least one fluid outlet, wherein the body comprises a first portion and a second portion, the first portion forming a first length, the second portion forming a second length adjacent to and non-overlapping with the first length, the first portion coupled to the second portion, the first portion having a first dimension spanning the cavity perpendicular to the axis between opposing points on the at least one wall, the second portion having a second dimension spanning the cavity perpendicular to the axis between opposing points on the at least one wall, the first dimension being greater than the second dimension, the anti-rotation element being disposed along the stem within the second portion.

18. The fire hydrant of claim 10, further comprising at least one fluid outlet, wherein the body comprises a first portion and a second portion, the first portion forming a first length, the second portion forming a second length adjacent to and non-overlapping with the first length, the first portion coupled to the second portion, the first portion having a first dimension spanning the cavity perpendicular to the longitudinal axis between opposing points on the at least one wall, the second portion having a second dimension spanning the cavity perpendicular to the longitudinal axis between opposing points on the at least one wall, the first dimension being greater than the second dimension, the anti-rotation pin opening extending through the at least one wall of the second portion.

19. A fire hydrant barrel comprising:
a body having at least one wall defining an internal cavity, and an anti-rotation pin opening through the at least one wall;
a stem extending through the cavity of the body, the stem having an anti-rotation element;
an anti-rotation bushing positioned in the anti-rotation pin opening; and
the anti-rotation pin positioned in the anti-rotation bushing,
the anti-rotation pin opening and the anti-rotation element configured to receive the anti-rotation pin to lock the stem from rotating with respect to the body, the anti-rotation pin configured to engage or disengage the anti-rotation element and to engage the anti-rotation pin opening to lock or release the stem from rotational movement relative to the body.

* * * * *